Nov. 3, 1964 G. H. CHARLTON ETAL 3,155,346
FLYING CONTROL SYSTEM FOR AIRCRAFT
Filed Oct. 5, 1962 2 Sheets-Sheet 1

George H. Charlton
Eric Ebdon
Kenneth D. Harris
Inventors

By
Stevens, Davis, Miller & Mosher
Attorneys

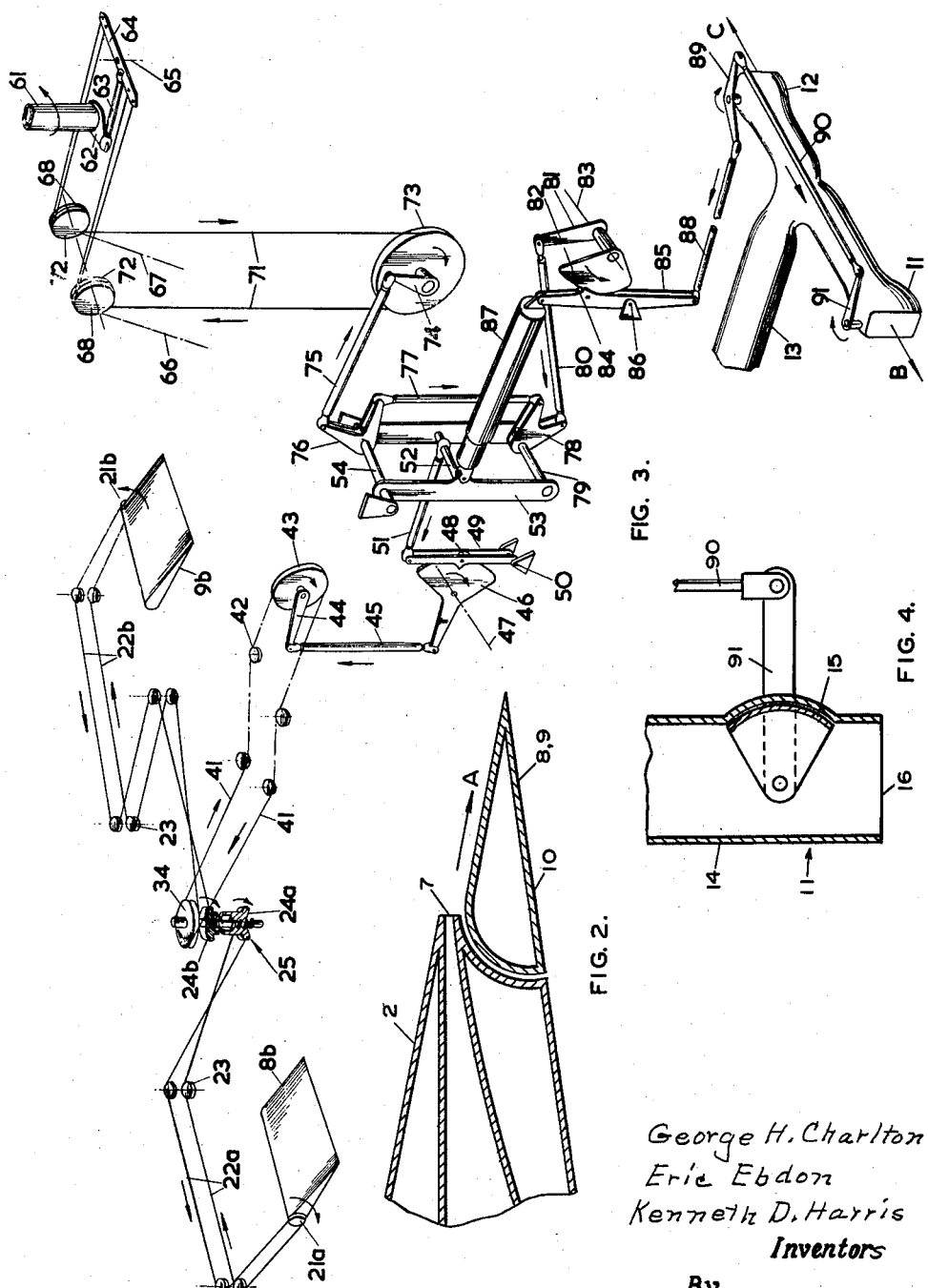

3,155,346
FLYING CONTROL SYSTEM FOR AIRCRAFT
George Hubert Charlton, Luton, Eric Ebdon, Caddington, near Luton, and Kenneth David Harris, Flitwick, England, assignors to Power Jets (Research and Development) Limited, London, England, a British company
Filed Oct. 5, 1962, Ser. No. 228,709
Claims priority, application Great Britain Oct. 13, 1961
3 Claims. (Cl. 244—75)

The present invention relates to flying control systems for aircraft. It has particular application to aircraft operating on the "jet flap" principle, though it may also find application in other aircraft of the S.T.O.L. and V.T.O.L. types.

It is a feature of jet flap and other S.T.O.L. aircraft, and also of V.T.O.L. aircraft employing, for example, direct jet lift, that in certain flight phases the forward speed may be so low that the normal flying control surfaces, i.e. ailerons, elevators and rudder are ineffective. It is therefore necessary to make provision for the application of control forces to such aircraft by other means. The present invention is specifically concerned with an arrangement for control of an aircraft in yaw.

The invention accordingly provides a flying control system for an aircraft having ailerons on its wings and a control nozzle arranged to discharge a fluid stream in such a direction as to apply a yawing moment to the aircraft, said system comprising an interconnection between the ailerons and the nozzle such that on a differential movement of the ailerons tending to turn the aircraft in a given sense, the discharge from the nozzle is varied so as to produce a yawing moment in that sense.

In certain aircraft, and in particular, in a jet flap aircraft, the ailerons may also be operable, not only differentially, but also together in the same sense in the manner of flaps. It is a feature of the invention that in a flying control system for such an aircraft the interconnection is such that the nozzle discharge is varied only in response to differential movement of the ailerons and not in response to movement of the ailerons together in the same sense.

The interconnection may be such that the nozzle discharge is varied in response to movement of the ailerons over only part of their range of travel on each side of the datum position.

According to another feature of the invention the system further comprises an interconnection between the aircraft rudder and the nozzle such that on a movement of the rudder tending to turn the aircraft in a given sense, the discharge from the nozzle is varied so as to produce a yawing moment in that sense.

According to a further feature of the invention the interconnections are such that movement of either the ailerons or the rudder over their full range of travel is effective to give rise to variation of the nozzle discharge over its full range, further movements of the rudder or the ailerons being ineffective to vary the nozzle discharge.

One embodiment of the invention will now be described by way of example with reference to the accompanying drawings of which:

FIGURE 2 is a sectional view through the rear part of one wing of an aircraft.

FIGURE 3 is a schematic view of part of the aircraft flying control system.

FIGURE 4 is a fragmentary sectional view of one of the yaw control nozzles of the aircraft.

Figure 1:
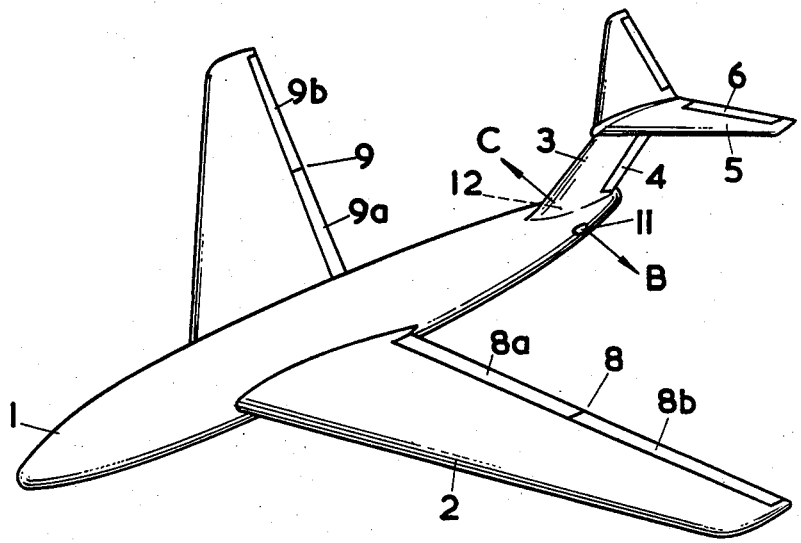
FIGURE 1 is a perspective view of a jet flap aircraft.

The aircraft of FIGURE 1 comprises a fuselage 1, wings 2, fin 3 with a rudder 4, and a tailplane 5 mounted high on the fin and carrying elevators 6. The aircraft is powered by one or more gas turbine jet propulsion engines connected to discharge propulsive jet streams through nozzles 7 in the wings—see FIGURE 2. These nozzles are long and shallow and extend along practically the full span of each wing so that the jet streams are discharged rearwardly as long thin spanwise-extending jet sheets. The wings carry trailing edge wing flaps 8, 9 which also extend along practically the full span of each wing, and the nozzles are arranged to discharge the jet sheets over the upper surfaces of the flaps as indicated by arrow A. By turning the flaps about their pivotal axes 10, the jet sheets can be deflected upwardly and downwardly from the rearward direction to vary the wing lift.

The flaps 8, 9 on each wing are each divided in a spanwise sense into inboard and outboard sections 8a, 8b, 9a, 9b. Both sections on both wings are operable together in the same sense by a control equivalent to the conventional flap control of an aircraft, while the outboard sections are operable differentially by a conventional pilot's control column. The outboard sections 8b, 9b of the flaps can accordingly act as ailerons and will be hereinafter referred as such. The system for operating the flaps and ailerons in the manner referred to is disclosed in co-pending application No. 21,176/60 and will not be further described here. The pilot's control column is also operable to actuate the elevators 6 while the rudder 4 is operable by a pilot's rudder bar or pedals in conventional manner.

The aircraft is also provided with two small yaw control nozzles 11, 12 mounted near the rear of the fuselage and arranged to discharge sideways in opposite directions as indicated by arrows B and C in FIGURE 1. As shown in FIGURE 3 the nozzles are branched from a common supply pipe 13 whereby they are supplied with gases bled from the engine efflux or compressed air bled from the engine compressor or compressors. Each nozzle consists of a rectangular section duct 14 (see FIGURE 4 which shows port nozzle 11) provided with a pivoted shutter 15 whereby the area of its discharge orifice 16 can be varied. The sideways-discharged streams B, C exert a yawing moment on the aircraft, the moment being variable by opposite variations of the nozzle discharge areas.

Figure 5:
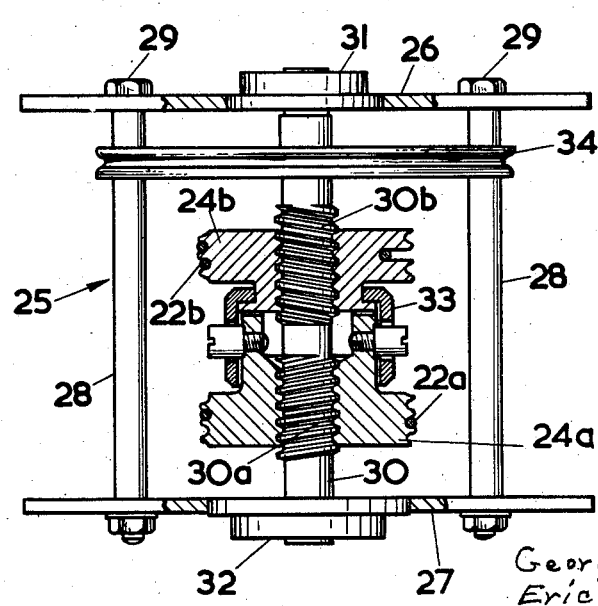
FIGURE 5 is a side view of a component of the system shown in FIGURE 3.

Reference is now made to FIGURE 3 in which the port and starboard ailerons of the aircraft are shown at 8b, 9b. Each aileron has fast with it a spool 21a, 21b around which is looped a cable 22a, 22b. These cables pass over pulleys 23 and are looped at their other ends around spools 24a, 24b in the "separator" unit 25 which is shown in greater detail in FIGURE 5. It consists of a pair of support plates 26, 27 held apart by distance tubes 28 threaded on bolts 29. A spindle 30 is rotatably supported at its ends in bearings 31, 32 carried by the support plates. The spindle has two similar threaded portions 30a, 30b of opposite hands and the spools 24a, 24b are carried on these threaded portions with their bosses almost touching. The spool 24a has attached to its boss a collar 33 having an inturned rim engaging in a groove in the boss of the spool 24b. A further spool 34 is mounted on the spindle 30 for rotation therewith.

Now as pointed out above the ailerons 8b, 9b are operable together in the same sense by a flap control. The run of the cables 22a, 22b is so contrived that when the ailerons are turned together in the same sense the spools 24a, 24b are turned in opposite senses. On account of the opposite hands of the threaded portions 30a, 30b the spools then move up or down the spindle 30 together while the spindle itself remains stationary. If however the ailerons are moved in opposite senses by the pilot's control column, the spools 24a, 24b are turned in the same sense, and hence tend to move towards or away from another. If they move towards one another, their bosses immediately come in contact, while if they move away from one another, separation is prevented by the engagement of the collar 33 in the groove. Hence the spools become locked together, their rotation on the spindle is prevented and the spindle itself is constrained to rotate, thus effecting rotation of the spool 34.

The unit 25 thus separates the "flap" and "aileron" movements of the ailerons 8b, 9b so that the spool 34 is turned only in response to an "aileron" movement of the pilot's control column.

A further cable 41 is looped around spool 34, passes over pulleys such as 42 and is looped at its other end around a further spool 43. A lever 44 is fast with this spool and is pivotally connected through a link 45 to turn a cam 46 about a fixed axis indicated at 47. A follower 48 bears against the face of this cam, the follower being mounted at a mid-position on a lever 49 which is pivotally mounted on a fixed pivot 50 at one end. At its other end the lever is connected through a link 51 to an axle 52 carried at approximately mid-length by a yoke 53 swinging about a fixed axle 54 at one end.

FIGURE 3 also shows hinge pin or axle 61 upon which the aircraft rudder 4 is mounted. The axle 61 carries a lever 62 connected by a link 63 to a double ended lever 64 mounted at its mid length to turn about a vertical axis indicated at 65. Cables 66, 67 passing over pulleys such as 68 connect the ends of the lever 64 to the pilot's rudder bar or pedals (not shown).

A further cable 71 is connected at its ends to the lever 64, passes over pulleys 72 and is looped around a spool 73. This spool is fast with a lever 74 pivotally connected by a link 75 to one arm of a bell crank lever 76 mounted on the axle 54 of the yoke 53. The other arm of this bell crank lever is pivotally connected by a link 77 to a parallel arm of another bell crank lever 78 mounted on an axle 79 supported by the free end of the yoke 53. The other arm of lever 78 is pivotally connected through a link 80 to a lever 81 fast with a cam 82 mounted to turn about a fixed axis indicated at 83.

A follower 84 bears against the face of the cam 82, being carried on a lever 85 mounted on a fixed pivot at 86. One end of this lever is connected to the yoke 53 by a spring box 87 which urges the followers 48, 84 into contact with their respective cams 46, 82. The other end of the lever 85 is pivotally connected by link 88 to the operating arm 89 for the shutter of the starboard yaw control nozzle 12, and the operating arm 89 is connected by link 90 to the operating arm 91 for the shutter of the port nozzle 11.

The operation of the flying control system will now be described. Let it be assumed that the pilot wishes to turn to starboard when in low speed flight. He accordingly operates the control column to lower the port aileron 8b and raise the starboard aileron 9b and he also operates the rudder bar or pedals to turn the rudder to starboard. The resultant movements of the ailerons 8b, 9b, the rudder axle 61 and the other parts of the system are indicated by arrows in FIGURE 3. The differential movement of the ailerons causes the spools 24a, 24b to turn in the same sense and hence the spindle 30 and spool 34 are rotated. The cam 46 is thereby turned, and its shaping is such that lever 49 turns about its pivot and the link 51 moves forwardly, i.e., to the left as shown in the drawing. The yoke 53 is thus turned about its axle so as to pull on link 80 and to turn the cam 82. This cam is so shaped as to cause the lever 85 to pull on link 88 which operates levers 89 and 91 to increase the discharge area of the starboard yaw control nozzle 12 and to decrease the discharge area of the port nozzle 11.

Turning of the rudder hinge pin 61 also results in turning of the spool 73 which acts through linkage 75, 76, 77, 78, 80 to turn the cam 82 in the same sense as it is turned as a result of movement of the ailerons. Thus the normal control movements of the ailerons and rudder to effect a turn to starboard both result in an increase of the discharge from the starboard yaw control nozzle 12 and a decrease in the discharge from the port nozzle 11. Thus the streams from the yaw control nozzles exert a moment tending to turn the aircraft to starboard.

Similarly a turn to port can be effected by the normal movements of the pilot's control column and rudder bar or pedals, the system operating in the opposite sense.

It is intended that it should be possible to effect maximum variation of the yaw control nozzle discharge by movement of either the ailerons or the rudder to their respective limiting positions. However the effects of the aileron and rudder movements on the nozzle area are additive. The cam 82 therefore has a cam face with a central profiled part and a dwell at each end. The length of the central part corresponds to movement of the aileron or of the rudder over their full range of travel, i.e., movement of the ailerons from port aileron fully down and starboard aileron fully up to port aileron fully up and starboard aileron fully down, or movement of the rudder from full starboard rudder to full port rudder causes relative movement of the follower from one end of the central part of the cam face to the other. The total rise of this central part of the cam face is such as to vary the control nozzle discharge over its full range, i.e. from maximum starboard yawing moment with starboard nozzle fully open and port nozzle shut to maximum port yawing moment with starboard nozzle shut and port nozzle fully open. The dwells on each side of the central part permit further movement of the ailerons or rudder to their limiting positions when any combination of aileron and rudder movement has resulted in maximum nozzle area adjustment, such further movement being ineffective to vary the nozzle discharge.

The cam face of cam 46 similarly has a profiled central part with a dwell at each end, the arrangement being such that it is only necessary to use a central part of the range of travel of the ailerons, say, ±10° on each side of their datum position out of a total possible travel of ±20°, to effect full range variation of the nozzle discharge. The length of the central part thus corresponds to the central part of the range of travel of the ailerons and its total rise effects variation of the nozzle discharge from maximum port to maximum starboard yawing moment, while the dwells allow for movement of the ailerons over the remainder of their range without variation of the nozzle discharge.

The connection between the shutters of the two control nozzles is desirably such that the opposite variations of nozzle discharge areas are substantially equal. The total gas flow to the two nozzles will then remain unchanged and control lag is minimised.

The variation of yaw control nozzle discharge could be effected by a direct connection between the nozzle shutters and the pilot's control column, rather than indirectly through the movements of the ailerons. In this case the separator unit 25 would not be required. However the arrangement described has the advantage that the forces required to operate the yaw control nozzles are provided by the jacks which operate the ailerons, and so no additional effort is required by the pilot in operating his control column.

Similarly a direct connection between the control nozzles and the rudder bar or pedals could replace the indirect connection through the rudder. The arrangement described is however convenient as the yaw nozzles will normally be close to the rudder hinge.

The system shown in the drawing could of course be varied in detail. Specifically, in order to reduce operating loads, the spring box 87 could be replaced by two individual spring boxes, one for each of the followers 48, 84.

We claim:

1. In an aircraft comprising opposite wings, an aileron on each wing, a control nozzle, means to supply fluid to the nozzle, the nozzle being arranged to discharge a stream of said fluid in such a direction as to apply a yawing moment to the aircraft, and means for varying the fluid discharge from the nozzle; a flying control system comprising a first control operatively connected to the ailerons to move them differentially, a second control operatively connected to the ailerons to move them together in the same sense, and an interconnection between the ailerons and said nozzle discharge varying means, said interconnection including means responsive only to differential movements of the ailerons to vary the nozzle discharge so as to produce a yawing moment tending to turn the aircraft in the same sense as the movement of the ailerons.

2. The combination of claim 1 wherein said responsive means comprises a spindle having two threaded portions of opposite hands; means mounting the spindle for rotation; two spools carried one on each of the threaded portions; two cables, one looped around each spool, the cable being operatively connected one to each of the ailerons in such a way that movement of the ailerons together in the same sense turns the spools in opposite senses; a further spool mounted on the spindle for rotation therewith; a further cable looped around said further spool and operatively connected to said nozzle discharge varying means; and means operable to lock the two first-mentioned spools together on the spindle in response to differential movement of the ailerons.

3. In an aircraft comprising opposite wings, an aileron in each wing, a control nozzle, means to supply fluid to the nozzle, the nozzle being arranged to discharge a stream of said fluid in such a direction as to apply a yawing moment to the aircraft and means for varying the fluid discharge from the nozzle; a flying control system comprising an interconnection between the ailerons and said nozzle discharge varying means comprising a cam operatively connected to be turned by differential movement of the ailerons and a follower operatively connected to vary the nozzle discharge, the cam face having a central part so shaped that movement of the ailerons over part of their range of travel on either side of their datum position tending to turn the aircraft in a given sense varies the nozzle discharge over its full range so as to produce a yawing movement in that sense and a dwell on each side of the central part corresponding to movement of the ailerons beyond said part of their range of travel whereby movement of the ailerons beyond said part is ineffective to vary the nozzle discharge.

References Cited in the file of this patent
UNITED STATES PATENTS

| | | |
|---|---|---|
| 2,266,529 | Wright | Dec. 16, 1941 |
| 2,941,754 | Bouffort | June 21, 1960 |
| 3,008,672 | Moore et al. | Nov. 14, 1961 |